US011811525B2

(12) United States Patent
Homchaudhuri et al.

(10) Patent No.: US 11,811,525 B2
(45) Date of Patent: Nov. 7, 2023

(54) TECHNIQUES FOR RATE ADAPTATION UNDER CONGESTION AND LATENCY CONSTRAINTS

(71) Applicant: QUALCOMM Incorporated, San Diego, CA (US)

(72) Inventors: Sandip Homchaudhuri, San Jose, CA (US); Pavankumar Veerashetty, San Jose, CA (US); Vincent Knowles Jones, IV, Redwood City, CA (US); Srinivas Katar, Fremont, CA (US); Jian Tao, Shanghai (CN); Rahul Jammula, Hyderabad (IN)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 17/251,572

(22) PCT Filed: Jul. 24, 2018

(86) PCT No.: PCT/CN2018/096799
§ 371 (c)(1),
(2) Date: Dec. 11, 2020

(87) PCT Pub. No.: WO2020/019156
PCT Pub. Date: Jan. 30, 2020

(65) Prior Publication Data
US 2021/0250117 A1  Aug. 12, 2021

(51) Int. Cl.
*H04L 1/00* (2006.01)
*H04L 47/25* (2022.01)
*H04W 28/02* (2009.01)

(52) U.S. Cl.
CPC ............ *H04L 1/0003* (2013.01); *H04L 47/25* (2013.01); *H04W 28/0289* (2013.01); *H04W 28/0273* (2013.01)

(58) Field of Classification Search
CPC ....... H04L 1/00; H04L 1/0001; H04L 1/0002; H04L 1/0003; H04L 47/00; H04L 47/10;
(Continued)

(56) References Cited

U.S. PATENT DOCUMENTS 6,975,599 B1 * 12/2005 Johnson ................ H04L 1/0002
370/278
10,009,781 B1 6/2018 Wang et al.
(Continued)

FOREIGN PATENT DOCUMENTS

CN  1703887  * 11/2005 ............ H04L 12/56
EP  1018821 A1  7/2000
(Continued)

OTHER PUBLICATIONS

International Search Report and Written Opinion—PCT/CN2018/096799—ISA/EPO—dated Apr. 23, 2019.
(Continued)

*Primary Examiner* — Warner Wong
(74) *Attorney, Agent, or Firm* — Dang M. Vo

(57) ABSTRACT

The present disclosure provides techniques for rate adaptation under congestion and latency constraints. The approaches described herein focus on aspects of latency, reliability, and power consumption instead of the traditional aspect of throughput. In an example, a method for rate adaptation is disclosed. The method may include determining whether to transmit a new packet or a retry packet. The method may also include reducing a maximum rate for a rate search in response to determining to transmit the retry packet. The method may further include transmitting the retry packet based on the reduced maximum rate.

26 Claims, 7 Drawing Sheets

(58) Field of Classification Search
CPC ....... H04L 47/25; H04L 47/26; H04L 47/263; H04L 43/08; H04L 43/0852; H04L 43/0858; H04L 43/0894; H04L 1/18; H04L 1/1812; H04L 1/1816; H04W 28/00; H04W 28/02; H04W 28/0289; H04W 88/181; H04W 80/00; H04W 28/0236; H04W 28/0273
See application file for complete search history.

(56) References Cited

U.S. PATENT DOCUMENTS

| | | | |
|---|---|---|---|
| 2005/0013303 A1* | 1/2005 | Gopalakrishnan | H04L 1/1819 370/252 |
| 2006/0187885 A1* | 8/2006 | Roy | H04L 1/203 370/332 |
| 2006/0221847 A1* | 10/2006 | Dacosta | H04W 28/22 370/252 |
| 2007/0081460 A1* | 4/2007 | Karacali-Akyamac et al. | H04L 1/203 370/332 |
| 2007/0189225 A1* | 8/2007 | Qian | H04L 47/10 370/332 |
| 2008/0175189 A1* | 7/2008 | Furrer | H04L 1/0016 370/328 |
| 2010/0014500 A1* | 1/2010 | Lee | H04L 27/2647 370/342 |
| 2010/0195521 A1 | 8/2010 | Wanstedt et al. | |
| 2011/0194419 A1* | 8/2011 | Lee | H04W 28/0205 370/242 |
| 2012/0213112 A1* | 8/2012 | Olgaard et al. | H04W 28/0205 370/242 |
| 2013/0343255 A1* | 12/2013 | Han | H04L 1/0009 370/312 |
| 2014/0211643 A1* | 7/2014 | Yu | H04L 1/0009 370/252 |
| 2014/0269655 A1 | 9/2014 | Du et al. | |
| 2015/0029923 A1* | 1/2015 | Xu | H04W 52/0216 370/336 |
| 2015/0163784 A1* | 6/2015 | Calin | H04L 1/0003 370/330 |
| 2015/0249936 A1* | 9/2015 | Chen | H04W 28/065 370/329 |
| 2016/0183186 A1* | 6/2016 | Wong | H04L 69/22 370/311 |
| 2017/0303159 A1* | 10/2017 | Ma | H04W 28/0252 |
| 2018/0035331 A1* | 2/2018 | Sundman | H04W 56/001 |
| 2018/0262240 A1* | 9/2018 | Cordeiro | H04B 7/0452 |
| 2018/0337713 A1* | 11/2018 | Elsherif | H04B 7/0417 |
| 2019/0342199 A1* | 11/2019 | Hurson | H04L 47/263 |

FOREIGN PATENT DOCUMENTS

| | | | |
|---|---|---|---|
| EP | 1096729 A1 | 5/2001 | |
| EP | 1986365 A1 | 10/2008 | |
| EP | 3205035 A1 | 8/2017 | |
| KR | 20070112218 A | 11/2007 | |
| WO | WO-2011087905 A1 * | 7/2011 | ........... H04L 1/0003 |
| WO | 2014186520 A1 | 11/2014 | |

OTHER PUBLICATIONS

Supplementary Partial European Search Report—EP18928137—Search Authority—Munich—dated May 23, 2022.

* cited by examiner

TECHNIQUES FOR RATE ADAPTATION UNDER CONGESTION AND LATENCY CONSTRAINTS

CROSS-REFERENCE TO RELATED APPLICATION

This application is a 35 U.S.C. § 371 National Phase Application of PCT Application No. PCT/CN2018/096799 filed Jul. 24, 2018, entitled "TECHNIQUES FOR RATE ADAPTATION UNDER CONGESTION AND LATENCY CONTRAINTS." The disclosure of this prior application is hereby incorporated by reference herein in its entirety.

BACKGROUND

The present disclosure relates generally to wireless communications systems, and more particularly, to techniques for rate adaptation under congestion and latency constraints.

The deployment of wireless local area networks (WLANs) in the home, the office, and various public facilities is commonplace today. Such networks typically employ an access point (AP) that connects a number of wireless stations (STAs) in a specific locality (e.g., home, office, public facility, etc.) to another network, such as the internet or the like. A set of STAs can communicate with each other through a common AP in what is referred to as a basic service set (BSS).

Techniques for transmission rate adaptation have traditionally been about delivering maximum throughput in a given condition or channel by managing three parameters: modulation/coding scheme (MCS) values, number of spatial streams (NSS), and/or channel bandwidth (BW) values. In other words, these parameters have typically been used for the sole benefit of maximizing throughput in a communication environment. However, in some instances, such as gaming, latency may be impacted do to standard adjustments of these parameters. For example, in some instances, latencies may cause increased power consumption in a congested environment and/or excessive retries of transmitting a single packet in a congested environment. In these instances, the reliability of packet transmissions may suffer using the common techniques of adjusting MCS values, NSS, or BW values for the purpose of maximized throughput.

Accordingly, it is desirable to have more efficient transmission rate adaptation to improve latency, reliability, and power consumption in a congested communication environment.

SUMMARY

The present disclosure provides aspects related to techniques for rate adaptation, and more specifically, to techniques for rate adaptation under congestion and latency constraints. The techniques described herein include the determination of data rates for transmitting a packet based on congestion and latency constraints. The approaches described herein focus on aspects of latency, reliability, and power consumption instead of the traditional aspect of throughput.

In an example, a method for rate adaptation is disclosed. The method may include determining whether to transmit a new packet or a retry packet. The method may also include reducing a maximum rate for a rate search in response to determining to transmit the retry packet. The method may further include transmitting the retry packet based on the reduced maximum rate under certain conditions or may be kept at the same rate in some other conditions.

In another example, an apparatus for rate adaptation is disclosed. The apparatus may include a memory that stores instructions, and a processor coupled with the memory. The processor may be configured to execute the instructions to determine whether to transmit a new packet or a retry packet. The processor may also be configured to execute the instructions to reduce a maximum rate for a rate search in response to determining to transmit the retry packet. The processor may further be configured to execute the instructions to transmit the retry packet based on the reduced maximum rate.

In yet another example, a method for rate adaptation is disclosed. The method may include determining that a packet to transmit is latency sensitive. The method may also include selecting a number of spatial streams (NSS) in response to the determining. The method may further include determining whether a cause of a packet error rate (PER) was due to congestion and/or a collision in a medium or due to a link margin issue. The method may also include transmitting the packet based on the selected NSS and based on the cause of the PER.

In yet another example, an apparatus for rate adaptation is disclosed. The apparatus may include a memory that stores instructions, and a processor coupled with the memory. The processor may be configured to execute the instructions to determine that a packet to transmit is latency sensitive. The processor may also be configured to execute the instructions to select a NSS in response to the determining. The processor may further be configured to execute the instructions to determine whether a cause of a PER was due to congestion and/or a collision in a medium or due to a link margin issue. The processor may be configured to execute the instructions to transmit the packet based on the selected NSS and based on the cause of the PER.

In yet another example, a method for rate adaptation is disclosed. The method may include determining that a PER has increased. The method may also include selecting a modulation/coding scheme (MCS) value based on the increased PER. The method may further include transmitting a packet based on the selected MCS value.

In yet another example, an apparatus for rate adaptation is disclosed. The apparatus may include a memory that stores instructions, and a processor coupled with the memory. The processor may be configured to execute the instructions to determine that a PER has increased. The processor may also be configured to execute the instructions to select an MCS value based on the increased PER. The processor may further be configured to execute the instructions to transmit a packet based on the selected MCS value.

In yet another example, a method for rate adaptation is disclosed. The method may include generating a number N of media access control (MAC) protocol data units (N-MPDUs), wherein N is any integer greater than one, and all of the N-MPDUs are the same MPDU. The method may also include transmitting the N-MPDUs. The method may further include determining a congestion status of a medium based on a response to the N-MPDUs. The method may also include transmitting a packet based on the congestion status.

In yet another example, an apparatus for rate adaptation is disclosed. The apparatus may include a memory that stores instructions, and a processor coupled with the memory. The processor may be configured to execute the instructions to generate a number N of N-MPDUs, wherein N is any integer greater than one, and all of the N-MPDUs are a same MPDU. The processor may also be configured to execute the instructions to transmit the N-MPDUs. The processor may further be configured to execute the instructions to determine a congestion status of a medium based on a response to the N-MPDUs. The processor may also be configured to execute the instructions to transmit a packet based on the congestion status.

It is understood that other aspects of apparatuses and methods will become readily apparent to those skilled in the art from the following detailed description, wherein various aspects of apparatuses and methods are shown and described by way of illustration. As will be realized, these aspects may be implemented in other and different forms and its several details are capable of modification in various other respects. Accordingly, the drawings and detailed description are to be regarded as illustrative in nature and not as restrictive.

DETAILED DESCRIPTION

Figure 1:
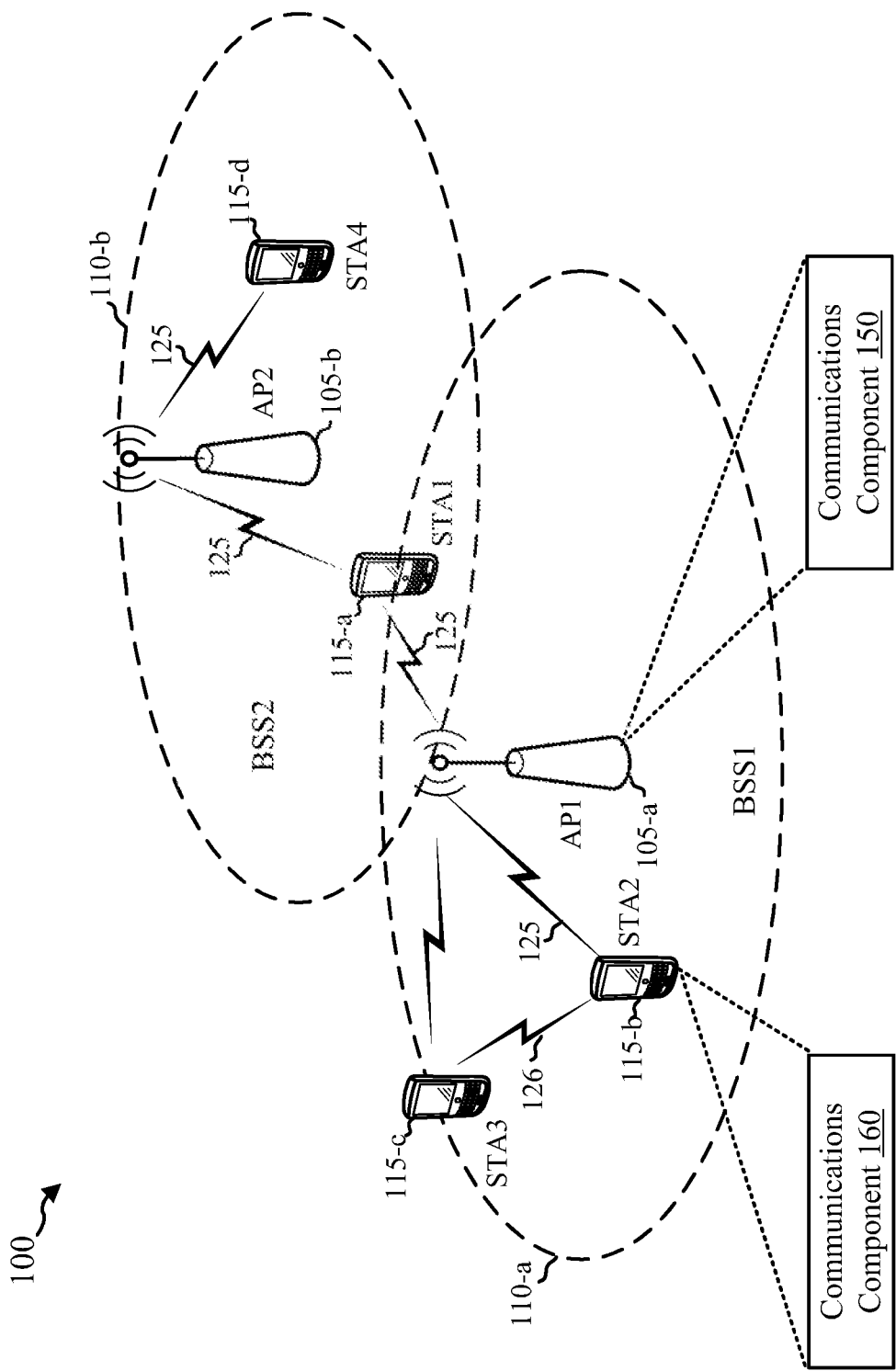
FIG. 1 illustrates an example of a wireless communication system in which aspects of the present disclosure can be employed.

Various concepts will be described more fully hereinafter with reference to the accompanying drawings. These concepts may, however, be embodied in many different forms by those skilled in the art and should not be construed as limited to any specific structure or function presented herein. Rather, these concepts are provided so that this disclosure will be thorough and complete, and will fully convey the scope of these concepts to those skilled in the art. The detailed description may include specific details. However, it will be apparent to those skilled in the art that these concepts may be practiced without these specific details.

Rate adaptation is an algorithm used in wireless communications, such as in wireless local area networks (WLAN), for example, to alter parameters of an uplink transmission based on a variety of factors, including feedback for modulation/coding schemes (MCS) values, number of spatial streams (NSS), and/or channel bandwidth (BW) values. As discussed above, transmission rate adaptation has traditionally been about delivering maximum throughput in a given condition, e.g., channel/received signal strength indicator (RSSI). Several concerns have arisen where latency issues, such as gaming latency, are impacted due to traditional rate adaptation algorithms used to adjust these parameters. Additionally, overall power consumption may increase and/or reliability may decrease due to excessive retries for a single packet in a congested environment when performing transmission rate adjustment using traditional rate adaptation algorithms. The present disclosure addresses concerns of latency, reliability, and power consumption using techniques for rate adaptation under congestion and latency constraints.

In general, rate adaptation is used across BWs of 20, 40, 80 and 160 MHz and supports one or more NSS (e.g., two NSS). Additionally, rate adaptation supports all four complementary code keying (CCK) rates in IEEE 801.11b mode in a 2.4 GHz band, all eight orthogonal frequency division multiplexing (OFDM) rates in IEEE 801.11g in a 2.4 GHz band and IEEE 801.11a modes in a 5 GHz band, all eight MCS rates in each of the NSS in high throughput (HT) mode, e.g., in 20 and 40 MHz BW, in a 2.4 GHz band and a 5 GHz band, all ten MCS rates in each of the NSS in very HT (VHT) mode, e.g., in 20, 40, 80 and 160 MHz BW in a 5 GHz band, support for VHT MCS 8 and 9 in 20 and 40 MHz in a 2.4 GHz band, transmission beamforming, space-time block coding (STBC), e.g., when number of transmit antennas NTX is greater than NSS in a HT/VHT mode, low density parity check (LDPC) in a HT/VHT mode, and short guard interval (GI) used for MCS 7 in a HT mode and MCS 7-9 used for a VHT mode, where transmission beamforming is enabled for a physical layer conformance procedure (PLCP) protocol data unit (PPDU), STBC is disabled.

In general, a rate adaptation algorithm consists of two components: a Rate-Search and a PER update. The Rate-Search looks to select the most optimal rate when determining a new rate. The PER update is based on feedback from a receiver, and looks to update the PER, which triggers the Rate-Search eventually. These two components of the rate adaptation algorithm run inline in a handler of a transmission completion interrupt and a data rate is selected per packet as opposed to a batched evaluation.

Regarding the Rate-Search, a rate adaptation algorithm returns an optimal data rate to be used for transmission based on the goodput (e.g., an application level throughput) calculation for each of the data rates. For all supported physical layer (PHY) rates, a running average of the PER will be saved on a per-peer basis. In an example, a goodput GR for a given PHY rate R is calculated as:

$GR = (100 - PR) * UR$ where PR is a running average of the PER for the PHY rate R in a channel, and UR is a data rate of an application-level for the PHY rate R.

In an example, at regular intervals of time, rate adaptation may probe at a data rate greater than the maximum rate previously used in order to determine whether a higher PHY rate may be sustained in the channel. This may be done only after some PPDUs have already been successful at the current rate. This same type of probing operation may similarly be performed when probing for a higher NSS. Further, the probing operation may be performed for each of the BWs that are to be used In an example, the Rate-Search may be described using Table 1 below.

TABLE 1

| MCS (NSS = 1) | T'put Mbps | PER % | Goodput Mbps | MCS (NSS = 2) | T'put Mbps | PER % | Goodput Mbps |
|---|---|---|---|---|---|---|---|
| 9 | 390 | 0 | 390 | 9 | 780 | 70 | 234 |
| 8 | 351 | 0 | 351 | 8 | 702 | 60 | 280.8 |

TABLE 1-continued

| MCS (NSS = 1) | T'put Mbps | PER % | Goodput Mbps | MCS (NSS = 2) | T'put Mbps | PER % | Goodput Mbps |
|---|---|---|---|---|---|---|---|
| 7 | 292.5 | 0 | 292.5 | 7 | 585 | 25 | 438.8 |
| 6 | 263.3 | 15 | 223.8 | 6 | 526.5 | 7 | 489.6 |
| 5 | 234 | 10 | 210.6 | 5 | 468 | 5 | 444.6 |
| 4 | 175.5 | 10 | 158 | 4 | 351 | 0 | 351 |
| 3 | 117 | 5 | 111.2 | 3 | 234 | 0 | 234 |
| 2 | 87.8 | 0 | 87.8 | 2 | 175.5 | 0 | 175.5 |
| 1 | 58.5 | 0 | 58.5 | 1 | 117 | 0 | 117 |
| 0 | 29.3 | 0 | 29.3 | 0 | 58.5 | 0 | 58.5 |

In this example, the data rate having an MCS of 7 (and NSS of 2) is the current maximum rate (i.e., Rate-Max). Rate-Max is the upper bound of the search space and is updated slowly based on PER accumulation. When a Rate-Search is performed, only data rates between the lowest data rate and Rate-Max are used. As shown by Table 1, with the MCS of 7, the PER is at 25% in one steady state condition The next data rate to be used will be a MCS of 6 and a Rate-Search may be performed from a lowest data rate to the Rate-Max (in this case MCS7).

In an example, a rate adaptation for a transmitting device may be two dimensional, meaning the rate adaptation works on MCS probing and NSS probing independently (e.g., MCS probing and NSS probing may be performed concurrently). The MCS probing may include a first timer which may be initiated based on an MCS value. For example, when an operating rate of a rate adaptation falls below a max supported MCS value (e.g., 9), the first timer may initiate. The NSS probing may include a second timer which may be initiated based on an NSS value. For example, when an operating rate of a rate adaptation falls below a max supported NSS value (e.g., 2), the second timer may initiate.

For either the MCS probing or the NSS probing, when a respective timer (e.g., first timer or second timer) expires, the transmitting device may send a predetermined number (e.g., 4) of aggregated media access control (MAC) protocol data units (A-MPDUs) in a PPDU (i.e., probe frame) at a probe rate based on the respective probing. The probe rate may be a desired rate the transmitting device wants to ramp up or move to, to achieve more throughput.

If the transmitting device receives an acknowledgment (ACK or Ack) or a block-Ack from a peer device in response to the probe frame, the probe frame is determined to be successful according to the probe rate used to transmit the probe frame. For purposes of this application an Ack, block-Ack, or negative-Ack (Nack or NACK) may be use interchangeable unless specifically indicated otherwise. When a probe frame is determined to be successful, the transmitting device reduces a time duration of the respective timer (first timer or second timer) by a predetermined reduced amount of time (e.g., half of current time duration). The reduced time duration allows the transmitting device to perform a subsequent probing operation (e.g., MCS probing or NSS probing) faster than previously performed and at a higher MCS value or MCS value to obtain a maximum throughput.

If the transmitting device does not receive an Ack or block-Ack from the peer device in response to the probe frame, the time duration of the respective timer is increased by a predetermined increased amount of time (e.g., double current time duration) such that a subsequent probing operation is performed slower than previously performed to avoid numerous changes in probe rates.

As the MCS probing or the NSS probing occurs, the transmitting device determines whether the PER of a higher MCS/NSS meets a desired goodput threshold. If the goodput threshold is met, the rate adaptation uses the transmission rate for a subsequent transmission. The timers (first timer or second timer) may be disabled if rate adaptation has already reached peak rates (e.g., MCS=9 or NSS=2).

Regarding the PER update, the PER may be calculated based on an Ack or block-Ack response to a probe frame that has been transmitted by the transmitting device. For probe frames which do not receive a block-Ack in response, a heuristic model is used to update the PER. The heuristic model accounts for random glitches in a channel condition that may lead to occasional probe frame/block-Ack loss (e.g., a loss caused by a collision). For every PER update, logic may ensure to maintain the monotonicity (e.g., either non-decreasing or non-increasing) of the PER across NSS as well as MCS. For example, if PER(NSS,MCS)=X then logic ensures:

$$PER_{(I,J)} \geq X \forall I \geq NSS, J \geq MCS;\ \text{and}$$

$$PER_{(I,J)} < X \forall I < NSS, J < MCS$$

where Rate-Max monotonicity may be maintained across NSS such that:

$$RateMaxNSS=3 \leq RateMaxNSS=2 \leq RateMaxNSS=1.$$

The following is an example, of a PER Update when a block-Ack is received. In this example, an MCS of 6 2×2 rate is assumed for transmission, and the frame transmitted is observed to have a 50% subframe PER. A new PER is an infinite impulse response (IIR) filter having an old PER*$7/8$+ an observed PER*$1/8$. In present disclosure techniques for adapting the speed of a PER update by changing the filter weights based on certain conditions are described (e.g., new PER=7*$7/8$+50/8=16%).

The following is an example of a PER update when a block-Ack is not received. In this example, an MCS 6 2×2 rate is assumed for transmission. Since no block-Ack has been received, the transmitting device retransmits the frame 4 times. In the case that no acknowledgment (ACK) is received for these consecutive retransmits, the PER is updated by 30%, as it is believed to have been a collision. Accordingly, the new PER is 37%.

During retry attempts, a probe frame included data rates within a Rate-Max window, to ensure monotonicity. The Rate-Max is not changed in the middle of the retries so, in some implementations, data rates higher than the current failing data rate may be used. For example, assuming a current transmission data rate having the MCS of 7 2×2 and the Rate-Max is at an MCS of 9 2×2. If the MCS of 7 2×2 suffers a predetermined number (e.g., 3) of consecutive failures (i.e., no block-Ack received in response), the rate adaptation algorithm may select an MCS of 9 and an MCS of 8 for the next consecutive retransmissions. These MCS values may be used due to the goodput calculation showing them to be better than the MCS of 7 because an accumulated PER is lower than the MCS of 7. However, this method may increase OTA retries and may also affect power consumption.

The present disclosure describes multiple aspects of rate adaptation to improve selection of a combination of MCS, NSS, and BW that improves rate adaptation algorithms especially in field conditions such as very congested networks and under ultra-low latency constraints. The aspects described herein may be performed individually or in combination with one or more other aspects.

In an aspect of rate adaptation, the use of two parallel loops of data rate adaptation are described. The first loop may adapt slowly around PER based on errors across packets, and the second loop may adapt much faster for packet retries to help improve reliability and latency. In another aspect of rate adaptation, latency specific optimizations are used such that MCS, NSS, and/or BW are adjusted and a subset is worked on. Within the subset, a fixed transmission rate may be used based on a congestion look-up table (LUT) instead of PER. In yet another aspect of rate adaptation, PER is classified as emanating from link margin or congestion/collision methods. In this aspect, if the link margin is a reason for PER, separate actions may be taken, such as lowering MCS lowering, or if collision is a reason for PER, something else is done, e.g., MCS is increased in a counter-intuitive manner. In yet another aspect of rate adaptation, HT, VHT, or OFDM rates are selected based on real time analysis of overall over-the-air (OTA) time of a packet. Choice between STBC and adapting cyclic delay diversity (CDD) to improve diversity aspects of receiver transmission (RX), when OFDM rates are decreased. In another aspect of rate adaptation, repetition coding is used to form an A-MPDU and improve reliability. Use of A-MPDU feedback may also be used to determine a cause of PER.

In a first implementation, a two-loop rate adaptation operation is performed to improve reliability in congested environment. Traditionally, a single-loop adaptation operation is used in which PER is updated unconditionally across new packets (non-retry packets) and for multiple retries of the same packet. Using the two-loop operation, a first loop penalizes a data rate based on PER that accumulates across packets (i.e., over a predetermined number of packets including both non-retry (or new) packets and retry packets). The first loop converges slowly and identifies the globally applied "Rate-Max" that a Rate-Search of a next new packet may use. Additionally, a second loop, geared towards the retry of a packet, converges rapidly towards a more reliable rate in a monotonic manner. The second loop may optimize a cost function of air time vs. transmission power. The second loop may also progressively reduce the Rate-Max such that the packet retries are sent based on timing (e.g., sent out quickly) and reliability and not necessarily based on highest throughput. For example, if a congestion level of a medium is "low," a retry packet may be sent at the lowest MCS such that the retry packet is more reliable from a link-margin standpoint and such that the lowered congestion prevents collision.

In another example, if statistically, packet retries require too many attempts, a significant amount of transmission power used for a single packet and may result in subsequent drop downs in the second loop more dramatically across many MCSs to minimize transmission power utilization. The dramatic reduction in data rate may depend on continuous learning and correlating a cost metric against congestion levels seen historically. For example, if found that in a certain congestion level a better cost metric is achieved when dropped down to a lowest data rate instead of slowly ramping down the data rate across many data rates, a rapid drop down in the data rate may be triggered for a future data rate reduction.

In some examples, the next new packet may use the Rate-Search having a Rate-Max which is still the global value. In other words, the fact that a retried packet may have used a significant amount of attempts may not reduce the global Rate-Max. By not penalizing the global Rate-Max, only reliability is optimized due to a first failed packet and throughput requirements remain in check for all new packets.

In a second implementation, latency optimizations may be achieved through OFDM vs HT/VHT rate selection and clear channel assessment (CCA) adaptation.

For an OFDM vs HT/VHT rate selection operation, once a high level operating system (HLOS) indicates that a packet is latency sensitive, the rate adaptation operation is performed in NSS 1 mode, when possible, to avail the link margin benefits of transmission diversity. While operating in NSS 1 mode, in some implementations, the rate adaptation operation is performed according to HT/VHT MCS rates to avail STBC for link margin improvement when the reliability has been impacted by link quality issues. In some implementations, the rate adaptation operation is performed according to IEEE 801.11a/OFDM (11a/OFDM) rates, which include packets for a small payload that are shorter than packets used for HT/VHT. This implementation of 11a/OFDM rates may be used when the lower reliability is caused by congestion/collision and reduced OTA time may help. In some implementations, a different cyclic shift delay (CSD) value may be selected based on which CSD value optimizes the link quality while retaining a reduced OTA time, as STBC is not used in this mode.

For CCA threshold adaptation operation, the CCA threshold may be increased to a higher threshold value (e.g., greater than or equal to −62 dBm) such that the packets go out faster. In another example, the CCA threshold may be decreased to a lower threshold value (e.g., less than −62 dBm) to let packets go out more conservatively such that a likelihood of collision is minimized. In yet another example, the CCA threshold may be adjusted based on a number of packet retries such that latency and collisions are balanced.

In a third implementation, a counter-intuitive rate adaptation operation may be used such that the MCS may be increased as PER increases if the cause of PER increase is classified to be collisions or medium congestion. Typically, a new MCS is always lowered when the PER increases. However, in this operation the counter-intuitive approach of increasing MCS as PER is increased allows rate adaptation in order to improve latency and reliability, as opposed to high throughput. In one implementation, under the constraint of latency, the dynamic spread of MCS is reduced into a smaller subset, e.g., {OFDM, MCS0, 1, 2 and 3}. In another implementation, a fixed MCS is selected based on results under a given congestion level that have been pre-characterized. For example, a LUT of congestion vs. data rate that the rate adaptation may be used when continuously monitoring congestion in a medium. In another implementation, rate adaptation is performed in a limited subset. For example, rate adaptation is initiated at an MCS of 3 and a lower data rate is selected when PER increases if and only if, the PER is attributed to link margin issues. In yet another implementation, rate adaptation is initiated at a low MCS (e.g., MCS of 1) and increased to a higher MCS when the PER increases if and only if the PER is attributed to congestion/collision and not attributed to link margin. By using this counter-intuitive approach, the OTA time may be reduced thereby reducing collision, and when link margin is good, transmission is better at higher data rates.

In some examples of the counter-intuitive rate adaptation, PER may be distinguished between link margin and collision. For example, an A-MPDU may be transmitted even when packets are small in length. The A-MPDU may include a block-Ack. A received block-Ack with missing Acks may indicate that certain packets were missed due to link margin.

However, the reception of the block-Ack itself may be a sign that collision did not occur. In this case, the PER is generally attributable to link margin and therefore desirable to improve link margin. In another example, if a block-Ack is not received at all, the lack of reception of the block-Ack may be attributable to a collision. In either example, the OTA time of packets may be shorted to minimize collision due to the congestion level.

In some examples of the counter-intuitive rate adaptation, the request-to-send/clear-to-send (RTS/CTS) may be used to protect packets during collision. For example, when PER improves while using RTS/CTS, the improvement may be attributed to a highly congested/collision-prone medium. In yet another implementation, failure to receive a CTS may be an indication of a collision in the medium.

In a fourth implementation, a repetition coding operation may be used. In general, latency sensitive packets may be small in size and as such not amenable to an A-MPDU formation. Distinguishing the reasoning for PER from link margin or collision may be more difficult without an A-MPDU. In some implementations, an N-MPDU packet may be generated by repeating the same packet N times. The N-MPDU may then be transmitted. A block-Ack received in response to the N-MPDU may reveal one or more of the following: link margin issues based on a location of missed packets in the aggregate, and, in some cases, how long the packet can go before collisions occur; link margin characterization based on a location of missed packets, as the quality of a receiver's channel handling may be determined for the end/middle/beginning of the packet. For example, continuous failures in the end may indicate collision, or a channel estimate that could not hold true till the length of the packet, and therefore the OTA time may be shortened by increasing MCS or selecting an 11a/OFDM rate for shorter packets. In another example, the loss of packets in the middle may indicate either a sudden deep fade caused by link margin issues, or a sudden collision. Since it is unknown whether the loss of packets is due to link margin or collision, loss of packets in the middle may therefore indicate that to maintain the same MCS and not decrease a size of packets. In some implementations, when a block-Ack is not received, this may indicate that a packet was lost due to a probable collision such that a receiver did not respond with an ACK, or the receiver's ACK was lost due to collision. In other words, the chances that the block-Ack failed to be received due to link margin is low because of a low data rate.

While these implementations may be described as being performed separately, in a some implementations, any one or more of the implementations may be performed in combination with another implementation. Additional details and explanations for the proposed techniques used for rate adaptation under congestion and latency constraints are provided below in connection with FIGS. 1-7.

FIG. 1 is a conceptual diagram 100 illustrating an example of a WLAN deployment in connection with various techniques described herein for rate adaptation under congestion and latency constraints. The WLAN may include one or more APs and one or more wireless stations or STAs associated with a respective AP. In this example, there are two APs deployed: AP1 105-a in basic service set 1 (BSS1) and AP2 105-b in BSS2, which may be referred to as an overlapping BSS or OBSS. AP1 105-a is shown as having at least three associated STAs (STA1 115-a, STA2 115-b, and STA3 115-c) and coverage area 110-a, while AP2 105-b is shown having one associated STA4 115-d and coverage area 110-b (STA1 115-a is within the coverage area 110-b of AP2 105-b and could be associated with AP2 105-b). The STAs 115 and AP 105 associated with a particular BSS may be referred to as members of that BSS. In the example of FIG. 1, the coverage area of AP1 105-a can overlap part of the coverage area of AP2 105-b such that STA1 115-a can be within the overlapping portion of the coverage areas. The number of BSSs, APs, and STAs, and the coverage areas of the APs described in connection with the WLAN deployment of FIG. 1 are provided by way of illustration and not of limitation.

As described above, an AP, such as AP1 105-a or AP2 105-b may communicate with multiple STAs 115 using rate adaptation techniques described herein. The AP1 105-a may include a communications component 150 (see e.g., FIG. 7) that is configured to perform aspects of the various techniques for rate adaptation under congestion and latency constraints described by this disclosure. Similarly, an STA 115 communicating with the AP1 105-a, such as the STA2 115-b, for example, can include a communications component 160 (see e.g., FIG. 6) that is configured to provide information needed by the AP1 105-a (e.g., Ack or block-Ack) to perform aspects of the various techniques for rate adaptation under congestion and latency constraints as described by this disclosure.

In some examples, the APs (e.g., AP1 105-a and AP2 105-b) shown in FIG. 1 are generally fixed terminals that provide backhaul services to STAs 115 within its coverage area or region. In some applications, however, the AP may be a mobile or non-fixed terminal. The STAs (e.g., STA1 115-a, STA2 115-b, STA3 115-c, STA4 115-d) shown in FIG. 1, which can be fixed, non-fixed, or mobile terminals, utilize the backhaul services of their respective AP to connect to a network, such as the internet. Examples of an STA include, but are not limited to: a cellular phone, a smart phone, a laptop computer, a desktop computer, a personal digital assistant (PDA), a personal communication system (PCS) device, a personal information manager (PIM), personal navigation device (PND), a global positioning system, a multimedia device, a video device, an audio device, a device for the Internet-of-Things (IoT), a wearable device, or any other suitable wireless apparatus requiring the backhaul services of an AP. An STA may also be referred to by those skilled in the art as: a subscriber station, a mobile unit, a subscriber unit, a wireless unit, a remote unit, a mobile device, a wireless device, a wireless communications device, a remote device, a mobile subscriber station, an access terminal, a mobile terminal, a wireless station, a remote terminal, a handset, a user agent, a mobile client, a client, a user equipment (UE), a wearable device, or some other suitable terminology. An AP may also be referred to as: a base station, a base transceiver station, a radio base station, a radio transceiver, a transceiver function, a wireless or Wi-Fi hotspot, or any other suitable terminology. The various concepts described throughout this disclosure are intended to apply to all suitable wireless apparatus regardless of their specific nomenclature.

Each of STA1 115-a, STA2 115-b, STA3 115-c, and STA4 115-d may be implemented with a protocol stack. The protocol stack may include a physical layer for transmitting and receiving data in accordance with the physical and electrical specifications of the wireless channel, a data link layer for managing access to the wireless channel, a network layer for managing source to destination data transfer, a transport layer for managing transparent transfer of data between end users, and any other layers necessary or desirable for establishing or supporting a connection to a network.

Each of AP1 105-*a* and AP2 105-*b* can include software applications and/or circuitry to enable associated STAs to connect to a network via communications link 125. The APs can send frames or packets to their respective STAs and receive frames or packets from their respective STAs to communicate data and/or control information (e.g., signaling).

Each of AP1 105-*a* and AP2 105-*b* can establish a communications link 125 with an STA that is within the coverage area of the AP. Communications link 125 can comprise communications channels that can enable both uplink and downlink communications. When connecting to an AP, an STA can first authenticate itself with the AP and then associate itself with the AP. Once associated, a communications link 125 may be established between the AP 105 and the STA 115 such that the AP 105 and the associated STA 115 may exchange frames or messages through a direct communications link 125. It should be noted that the wireless communication system, in some examples, may not have a central AP (e.g., AP 105), but rather may function as a peer-to-peer network between the STAs (e.g., STA2 115-*b* and STA3 115-*c* over communication link 126). Accordingly, the functions of the AP 105 described herein may alternatively be performed by one or more of the STAs 115.

While aspects of the present disclosure are described in connection with a WLAN deployment or the use of IEEE 802.11-compliant networks, those skilled in the art will readily appreciate, the various aspects described throughout this disclosure may be extended to other networks employing various standards or protocols including, by way of example, BLUETOOTH® (Bluetooth), HiperLAN (a set of wireless standards, comparable to the IEEE 802.11 standards, used primarily in Europe), and other technologies used in wide area networks (WAN)s, WLANs, personal area networks (PAN)s, or other suitable networks now known or later developed. Thus, the various aspects presented throughout this disclosure for performing operations for rate adaptation under congestion and latency constraints can be applicable to any suitable wireless network regardless of the coverage range and the wireless access protocols utilized.

In some aspects, one or more APs (e.g., AP1 105-*a* and AP2 105-*b*) can transmit on one or more channels (e.g., multiple narrowband channels, each channel including a frequency bandwidth) a beacon signal (or simply a "beacon"), via a communications link 125 to STA(s) 115 of the wireless communication system, which can help the STA(s) 115 to synchronize their timing with the APs 105, or which may provide other information or functionality.

A STA (e.g., STAs 115) can perform various techniques for rate adaptation under congestion and latency constraints that enhance probing operations at the STA. A packet error metric can refer to a measurement, a value, an index, a parameter, or the like that indicates a degree of performance in the transmission of packets. An example of a packet error metric used by way of illustration in this disclosure is the PER. Nevertheless, other types of packet error metrics can also be used in connection with the techniques described herein. A signal strength metric can refer to a measurement, a value, an index, a parameter, or the like that indicates a degree of signal strength relative to noise and/or interference. An example of a signal strength metric used by way of illustration in this disclosure is signal-to-interference-plus-noise ratio (SINR). Nevertheless, other types of signal strength metrics can also be used in connection with the techniques described herein.

Additional details regarding the techniques with which a STA can perform efficient rate adaptation operations are described below in connection with FIGS. 2-7.

Figure 2:
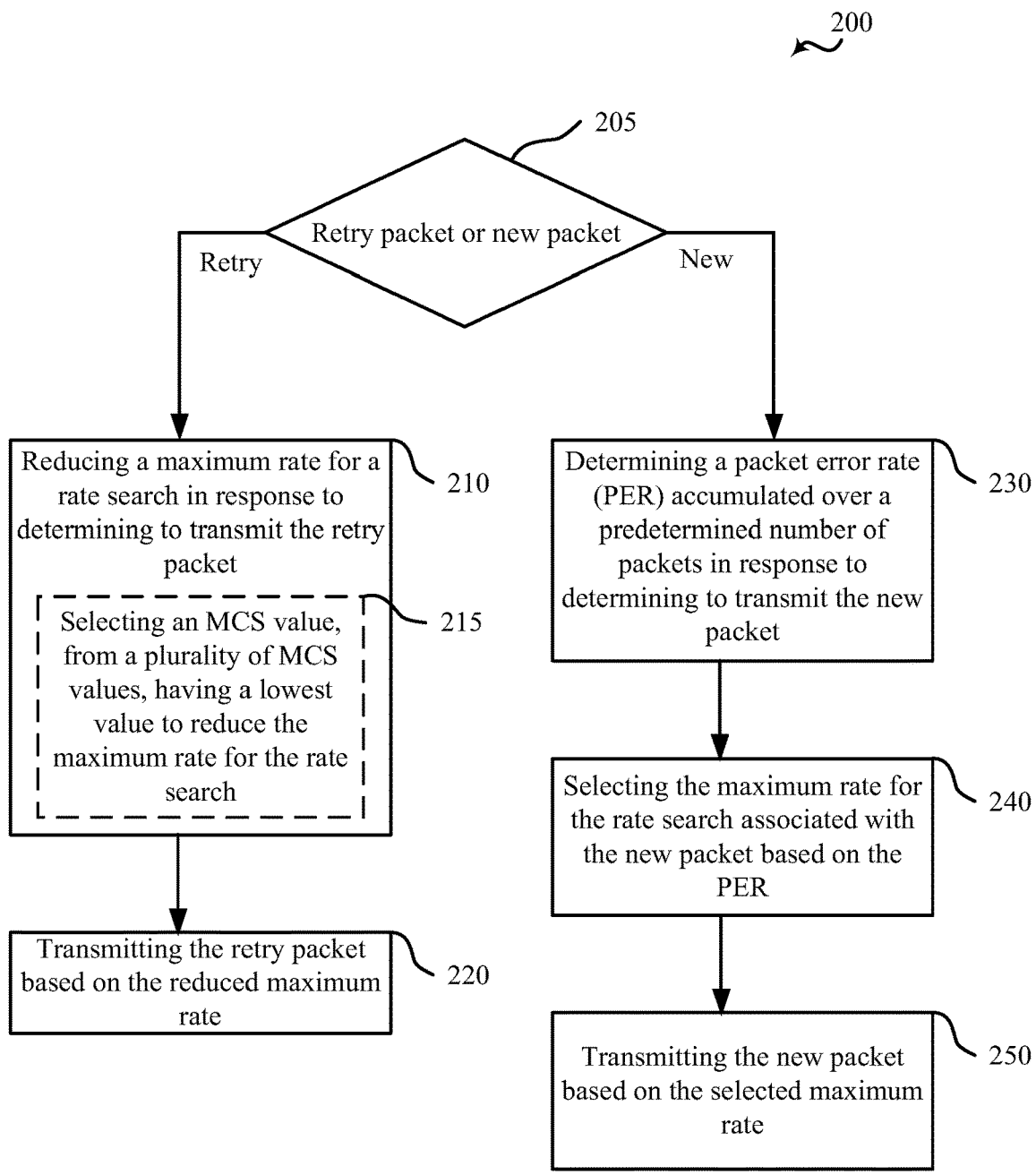
FIG. 2 illustrates an example of a method for wireless communications implemented on a STA in accordance with various aspects of the present disclosure.

FIG. 2 illustrates an example of a method 200 performed by the STA during rate adaptation through the use of a two-parallel loop operation. The method may be implemented on an STA (e.g., STAs 115). At block 205, a STA may determine whether to transmit a retry packet or a new packet. In an aspect, the processor 612, the modem 614, the communications component 160, and/or the two-loop operation component 652 may be used to determine whether to transmit a retry packet or a new packet. If the a next packet is determined to be a retry packet, the method moves to block 210. Otherwise, the method moves to block 230.

At block 210, the STA may reduce a maximum rate for a rate search in response to determining to transmit the retry packet. In an aspect, the processor 612, the modem 614, the communications component 160, and/or the two-loop operation component 652 may be used to reduce the maximum rate for the rate search in response to determining to transmit the retry packet. In this example, the STA may progressively reduce the Rate-Max such that the packet retries are sent based on timing (i.e., sent out fast) and reliability and not necessarily based on highest throughput. For example, at block 215, the STA may optionally select an MCS value, from a plurality of MCS values, having a lowest value to reduce the maximum rate for the rate search. The STA may determine that a congestion level of a medium is "low" and therefore transmit a retry packet at the lowest MCS such that the retry packet is more reliable from a link-margin standpoint and such that the lowered congestion prevents collision. In some examples, the STA may determine, based on past congestion level analysis, that a better cost metric is achieved at a current congestion level by quickly reducing the data rate for transmitting a retry packet at a lowest data rate instead of slowly ramping down the data rate.

At block 220, the STA may transmit the retry packet based on the reduced maximum rate. In an aspect, the processor 612, the modem 614, the communications component 160, and/or the two-loop operation component 652 may be used to transmit the retry packet based on the reduced maximum rate.

At block 230, the STA may determine a PER accumulated over a predetermined number of packets in response to determining to transmit the new packet. In an aspect, the processor 612, the modem 614, the communications component 160, and/or the two-loop operation component 652 may be used to determine a PER accumulated over a predetermined number of packets in response to determining to transmit the new packet. In some examples, the STA may adapt slowly around PER based on errors across packets (both non-retry packets and retry packets).

At block 240, the STA may select the maximum rate for a rate search associated with the new packet based on the PER. In an aspect, the processor 612, the modem 614, the communications component 160, and/or the two-loop operation component 652 may be used to select the maximum rate for a rate search associated with the new packet based on the PER. In an example, the STA may use a LUT containing the maximum rate for rate search based on PER. In another example the STA may calculate the maximum rate based on the PER.

At block 250, the STA may transmit the new packet based on the selected maximum rate. In an aspect, the processor 612, the modem 614, the communications component 160, the two-loop operation component 652, and/or the transceiver 602 may be used to transmit the new packet once the maximum rate is selected.

Figure 3:
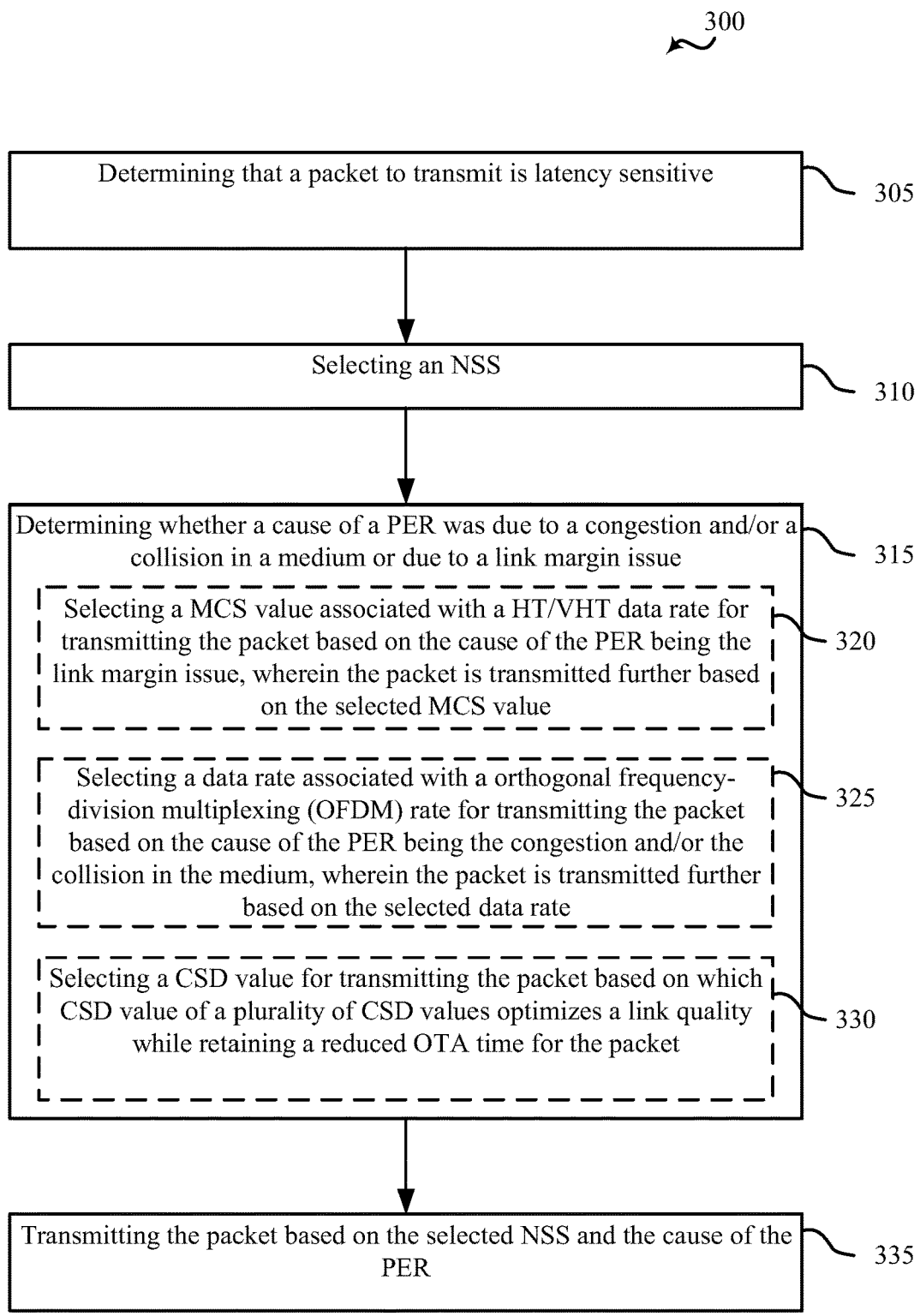
FIG. 3 illustrates an example of another method for wireless communications implemented on a STA in accordance with various aspects of the present disclosure.

FIG. 3 illustrates an example of a method 300 performed by the STA during rate adaptation through the use 11a/OFDM vs HT/VHT rate selection. The method may be implemented on a STA (e.g., STAs 115). At block 305, a STA may determine that a packet to transmit is latency sensitive. In an aspect, the processor 612, the modem 614, the communications component 160, and/or the latency optimization component 654 may be used to determine that a packet to transmit is latency sensitive. For example, the STA may receive an indication that the packet is for a gaming application or other latency sensitive applications from the HLOS.

At block 310, the STA may select an NSS in response to determining that the packet is latency sensitive. In an aspect, the processor 612, the modem 614, the communications component 160, and/or the latency optimization component 654 may be used to select the NSS. In some examples, an NSS of 1 may be selected, if possible, to avail the link margin benefits of transmission diversity.

In some examples, the STA, at block 315, may determine whether a cause of a PER was due to a congestion and/or a collision in a medium or due to a link margin issue. In an aspect, the processor 612, the modem 614, the communications component 160, and/or the latency optimization component 654 may be used to determine whether a cause of a PER was due to a congestion and/or a collision in a medium or due to a link margin issue. In an example, the STA may determine that PER was due to congestion by monitoring receive/transmit activities in the medium. In another example, the STA may determine PER was due to one or more collisions based on one or more missing packets. In another example, the STA may determine PER was due to link margin issues based on a block-Ack having missing Acks.

At block 320, the STA may optionally select an MCS value associated with a HT/VHT data rate for transmitting the packet based on the cause of the PER being the link margin issue, wherein the packet is transmitted further based on the selected MCS value. In an aspect, the processor 612, the modem 614, the communications component 160, and/or the latency optimization component 654 may be used to select the MCS value. The STA may determine the MCS value based on a LUT.

In some examples, the STA, at block 325, may optionally select a data rate associated with an 11a/OFDM rate for transmitting the packet based on the cause of the PER being the congestion and/or the collision in the medium, wherein the packet is transmitted further based on the selected data rate. In an aspect, the processor 612, the modem 614, the communications component 160, and/or the latency optimization component 654 may be used to select the 11a/OFDM rate. The STA may determine the 11a/OFDM rate based on a LUT.

In some examples, the STA, at block 330, may optionally select a CSD value for transmitting the packet based on which CSD value of a plurality of CSD values optimizes a link quality while retaining a reduced OTA time for the packet. In an aspect, the processor 612, the modem 614, the communications component 160, and/or the latency optimization component 654 may be used to select the CSD value. The STA may select the CSD value based on a LUT.

At block 335, the STA may transmit the packet based on the selected NSS. In an aspect, the processor 612, the modem 614, the communications component 160, the latency optimization component 654, and/or the transceiver 602 may be used to transmit the packet once the NSS is selected.

Figure 4:
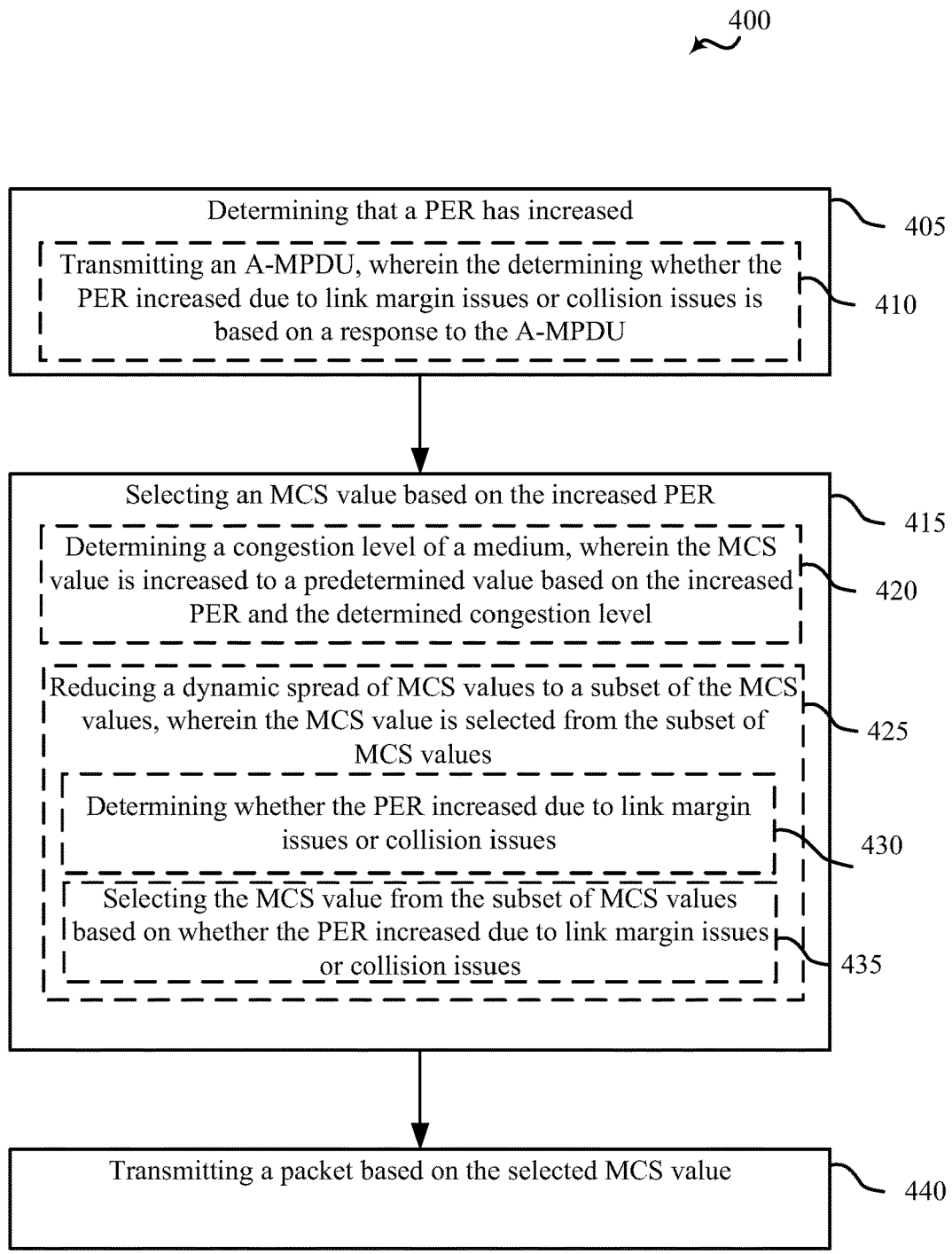
FIG. 4 illustrates an example of yet another method for wireless communications implemented on a STA in accordance with various aspects of the present disclosure.

FIG. 4 illustrates an example of a method 400 performed by the STA during rate adaptation through the use of a counter-intuitive rate adaptation. The method may be implemented on a STA (e.g., STAs 115). At block 405, a STA may determine that a PER has increased. In an aspect, the processor 612, the modem 614, the communications component 160, and/or the counter-intuitive rate adaptation component 654 may be used to determine that the PER has increased. The STA may determine an increase in the PER by monitoring a response to transmitted packets. For example, at block 410, the STA may optionally transmit an aggregated media access control (MAC) protocol data unit (A-MPDU), and determine whether the PER increased due to link margin issues or collision issues based on a response to the A-MPDU.

At block 415, a STA may select an MCS value based on the increased PER. In an aspect, the processor 612, the modem 614, the communications component 160, and/or the counter-intuitive rate adaptation component 654 may be used to select an MCS value based on the increased PER. In an example, the STA may select the MCS value based on a LUT. In one example, the STA may, at block 420, optionally determine a congestion level of a medium, wherein the MCS value is increased to a predetermined value based on the increased PER and the determined congestion level. The STA may determine a congestion level of the medium by monitoring the general CCA behavior and receive/transmit activities in the medium. The STA may determine collisions by monitoring lost responses to packets (e.g., un received Acks or block-Acks).

In another example, the STA may, at block 425, optionally reduce a dynamic spread of MCS values to a subset of the MCS values, wherein the MCS value is selected from the subset of MCS value. For example, the STA may reduce the dynamic spread of MCS into a smaller subset, e.g., {OFDM, MCSO, 1, 2 and 3}, and may select the MCS value from the smaller subset. In some examples, the STA, at block 430, may optionally determine whether the PER increased due to link margin issues or collision issues. For example, the STA may generate and transmit an A-MPDU. In response, the STA may receive a block-Ack with missing Acks, which may indicate that certain packets were missed due to link margin. Alternatively, the STA may receive the block-Ack itself, which may indicate that a collision did not occur. In another example, if the STA does not receive a block-Ack, the STA may attribute the lack of reception of the block-Ack to a collision.

At block 435, the STA may optionally select the MCS value from the subset of MCS values based on whether the PER increased due to link margin issues or collision issues. For example, when the STA determines that the PER is attributable to link margin, the STA may adjust the MCS value to improve link margin. In another example, when the STA determines that the PER is attributable to collision, the STA may shorten the OTA time of packets by adjusting the MCS value to minimize collision due to the congestion level.

At block 440, the STA may transmit a packet based on the selected MCS value. In an aspect, the processor 612, the modem 614, the communications component 160, the counter-intuitive rate adaptation component 654, and/or the transceiver 602 may be used to transmit the packet once the MCS value is selected.

Figure 5:
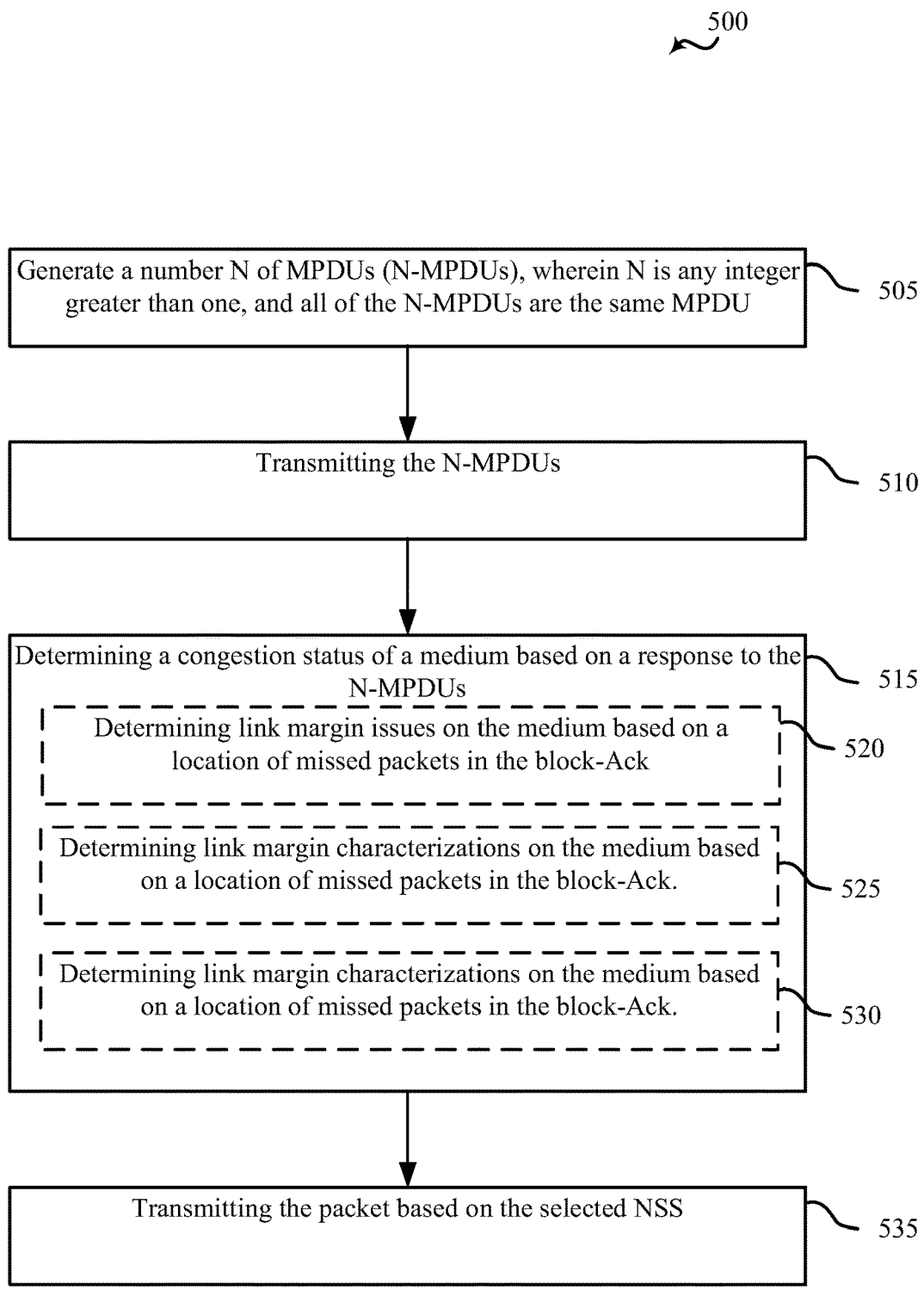
FIG. 5 illustrates an example of yet another method for wireless communications implemented on a STA in accordance with various aspects of the present disclosure.

FIG. 5 illustrates an example of a method 500 performed by the STA during rate adaptation for repetition coding. The method may be implemented on a STA (e.g., STAs 115). At block 505, a STA may generate a number N of MPDUs (N-MPDUs), wherein N is any integer greater than one, and all of the N-MPDUs are the same MPDU. In an aspect, the processor 612, the modem 614, the communications component 160, and/or the repetition coding component 656 may be used to generate the N-MPDUs.

At block 510, the STA may transmit the N-MPDUs. In an aspect, the processor 612, the modem 614, the communications component 160, the repetition coding component 656, and/or the transceiver 602 may be used to transmit the N-MPDUs. At block 515, a STA may determine a congestion status of a medium based on a response to the N-MPDUs. In an aspect, the processor 612, the modem 614, and/or the communications component 160 may be used to determine the congestion status. For example, at block 520, the STA may determine the congestion status includes link margin issues on the medium based on a location of missed packets in the block-Ack, when the response to the N-MPDUs includes a block-Ack. In another example, at block 525, when a response to the N-MPDUs includes a block-Ack, the STA may determine link margin characterizations on the medium based on a location of missed packets in the block-Ack. In yet another example, at block 530, when the response to the N-MPDUs does not include receiving a block-Ack, the STA may determine there was a collision with the N-MPDUs or with a transmitted block-Ack.

At block 535, the STA may transmit a packet based on the congestion status. In an aspect, the processor 612, the modem 614, the communications component 160, the repetition coding component 656, and/or the transceiver 602 may be used to transmit the packet. In an example, once the congestion status is determined, the STA may adjust settings such as the MCS, NSS, or BW, based on the congestion status.

Figure 6:
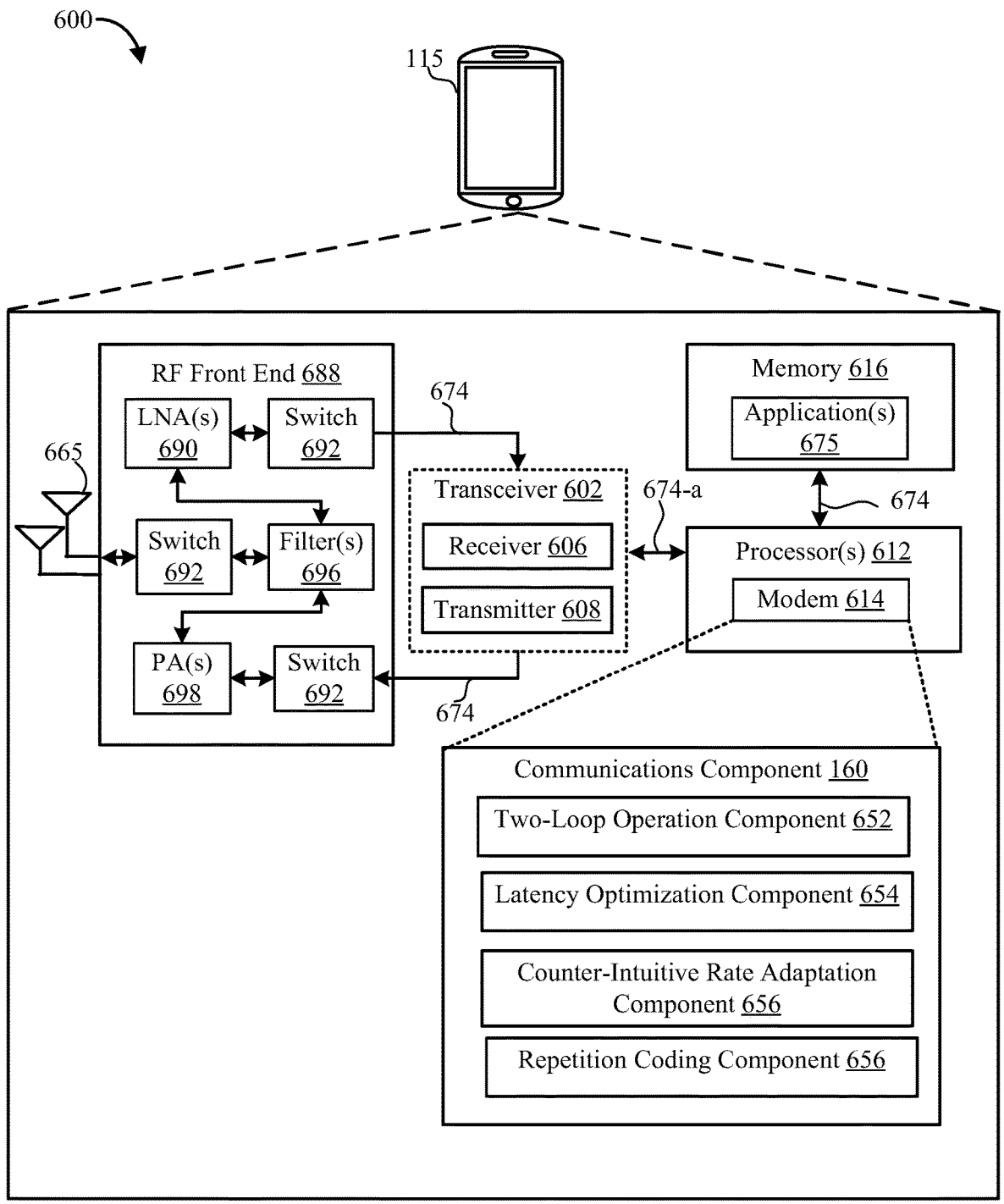
FIG. 6 illustrates an example of hardware implementation of a STA that can be employed within a wireless communication system in accordance with various aspects of present disclosure.

FIG. 6 illustrates an example of hardware implementation of a STA 115 (e.g., STA1 115-a or STA2 115-b of FIG. 1) that can be employed within a wireless communication system to perform the proposed rate adaptation under congestion and latency constraints described in connection with the scenarios or conditions discussed above. The hardware components and subcomponents of the STA 115 can be used to implement one or more methods (e.g., methods 200, 300, 400, and 500) described herein. For example, one example of an implementation of STA 115 can include a variety of components, some of which have already been described above, but including components such as one or more processors 612, memory 616, and transceiver 602 in communication via one or more buses 674, which may operate in conjunction with the communications component 160 to enable one or more of the functions described herein related to rate adaptation under congestion and latency constraints. Further, the one or more processors 612, which include a modem 614, memory 616, transceiver 602, RF front end 688 and one or more antennas 665, may be configured to support voice and/or data calls (simultaneously or non-simultaneously) in one or more radio access technologies (RATs).

In an aspect, the one or more processors 612 can include the modem 614 that uses one or more modem processors. The various functions related to the communications component 160 can be included in the modem 614 and/or the processors 612 and, in an aspect, can be executed by a single processor, while in other aspects, different ones of the functions may be executed by a combination of two or more different processors. For example, in an aspect, the one or more processors 612 can include any one or any combination of a modem processor, or a baseband processor, or a digital signal processor, or a transmit processor, or a receiver processor, or a transceiver processor associated with transceiver 602. In other aspects, some of the features of the one or more processors 612 and/or modem 614 associated with the communications component 160 can be performed by transceiver 602.

In an aspect, the communications component 160 may include the two-loop operation component 652, the latency optimization component 654, the counter-intuitive rate adaptation component 656, and the repetition coding component 656. In an example, the two-loop operation component 652 may be configured to perform a loop for identifying a Rate-Max that a Rate-Search may use for a new packet to be transmitted, and perform a second loop geared towards the retry of a packet, which converges rapidly towards a more reliable rate in a monotonic manner, as previously described (see e.g., FIG. 2). In another example, the latency optimization component 654 may be configured to use one of 11a/OFDM vs HT/VHT rate selection or CCA adaptation when performing rate adaptation, as previously described (see e.g., FIG. 3). In another example, the counter-intuitive rate adaptation component 656 may be configured to increase a value of MCS as PER is increased, as previously described (see e.g., FIG. 4). The counter-intuitive rate adaptation component 656 may also be configured to select an MCS value based on a subset of MCS values. In another example, the repetition coding component 656 may be configured to generate an MPDU N number of times, where N is any positive integer, and determine whether congestion in a medium is caused by a link-margin issue or a collision issue based on one or more responses to the N-MPDUs being transmitted, as previously described (see e.g., FIG. 5).

Also, memory 616 can be configured to store data and/or instructions used herein, local versions of applications 675, and/or local versions of the communications component 160, including one or more of its subcomponents being executed by at least one processor 612. Memory 616 can include any type of computer-readable medium usable by a computer or at least one processor 612, such as random access memory (RAM), read only memory (ROM), tapes, magnetic discs, optical discs, volatile memory, non-volatile memory, and any combination thereof. In an aspect, for example, memory 616 may be a non-transitory computer-readable storage medium that stores one or more computer-executable codes defining the communications component 160 and/or one or more of its subcomponents (e.g., the two-loop operation component 652, the latency optimization component 654, the counter-intuitive rate adaptation component 656, and the repetition coding component 656), and/or data associated therewith, when STA 115 is operating at least one processor 612 to execute the communications component 160 and/or one or more of its subcomponents.

Transceiver 602 can include at least one receiver 606 and at least one transmitter 608. The receiver 606 can include hardware, firmware, and/or software code executable by a processor for receiving data, the code comprising instructions and being stored in a memory (e.g., computer-readable medium). The receiver 606 can be, for example, a radio frequency (RF) receiver. In an aspect, the receiver 606 can receive signals transmitted by at least one AP 105. Additionally, the receiver 606 can process such received signals, and also may obtain measurements of the signals, such as, but not limited to, Ec/Io, SNR, SINR, MU-SINR, RSRP, RSSI, etc. The transmitter 608 can include hardware, firmware, and/or software code executable by a processor for transmitting data, the code comprising instructions and being stored in a memory (e.g., computer-readable medium). A suitable example of the transmitter 608 can include, but is not limited to, an RF transmitter.

Moreover, in an aspect, STA 115 can include RF front end 688, which can operate in communication with one or more antennas 665 and transceiver 602 for receiving and transmitting radio transmissions, for example, wireless communications transmitted by at least one AP 105 or wireless transmissions transmitted by STA 115. RF front end 688 can be connected to one or more antennas 665 and can include one or more low-noise amplifiers (LNAs) 690, one or more switches 692, one or more power amplifiers (PAs) 698, and one or more filters 696 for transmitting and receiving RF signals.

In an aspect, LNA 690 can amplify a received signal at a desired output level. In an aspect, each LNA 690 can have a specified minimum and maximum gain values. In an aspect, RF front end 688 can use one or more switches 692 to select a particular LNA 690 and its specified gain value based on a desired gain value for a particular application.

Further, for example, one or more PA(s) 698 can be used by RF front end 688 to amplify a signal for an RF output at a desired output power level. In an aspect, each PA 698 can have specified minimum and maximum gain values. In an aspect, RF front end 688 can use one or more switches 692 to select a particular PA 698 and its specified gain value based on a desired gain value for a particular application.

Also, for example, one or more filters 696 can be used by RF front end 688 to filter a received signal to obtain an input RF signal. Similarly, in an aspect, for example, a respective filter 696 can be used to filter an output from a respective PA 698 to produce an output signal for transmission. In an aspect, each filter 696 can be connected to a specific LNA 690 and/or PA 698. In an aspect, RF front end 688 can use one or more switches 692 to select a transmit or receive path using a specified filter 696, LNA 690, and/or PA 698, based on a configuration as specified by transceiver 602 and/or processor 612.

As such, transceiver 602 can be configured to transmit and receive wireless signals through one or more antennas 665 via RF front end 688. In an aspect, transceiver 602 can be tuned to operate at specified frequencies such that STA 115 can communicate with, for example, one or more APs 105 or one or more cells associated with one or more STAs 115. In an aspect, for example, modem 614 can configure transceiver 602 to operate at a specified frequency and power level based on the STA configuration of the STA 115 and the communication protocol used by modem 614.

In an aspect, modem 614 can be a multiband-multimode modem, which can process digital data and communicate with transceiver 602 such that the digital data is sent and received using transceiver 602. In an aspect, modem 614 can be multiband and be configured to support multiple frequency bands for a specific communications protocol. In an aspect, modem 614 can be multimode and be configured to support multiple operating networks and communications protocols. In an aspect, modem 614 can control one or more components of STA 115 (e.g., RF front end 688, transceiver 602) to enable transmission and/or reception of signals from the network based on a specified modem configuration. In an aspect, the modem configuration can be based on the mode of the modem 614 and the frequency band in use. In another aspect, the modem configuration can be based on STA configuration information associated with STA 115 as provided by the network during cell selection and/or cell reselection.

Figure 7:
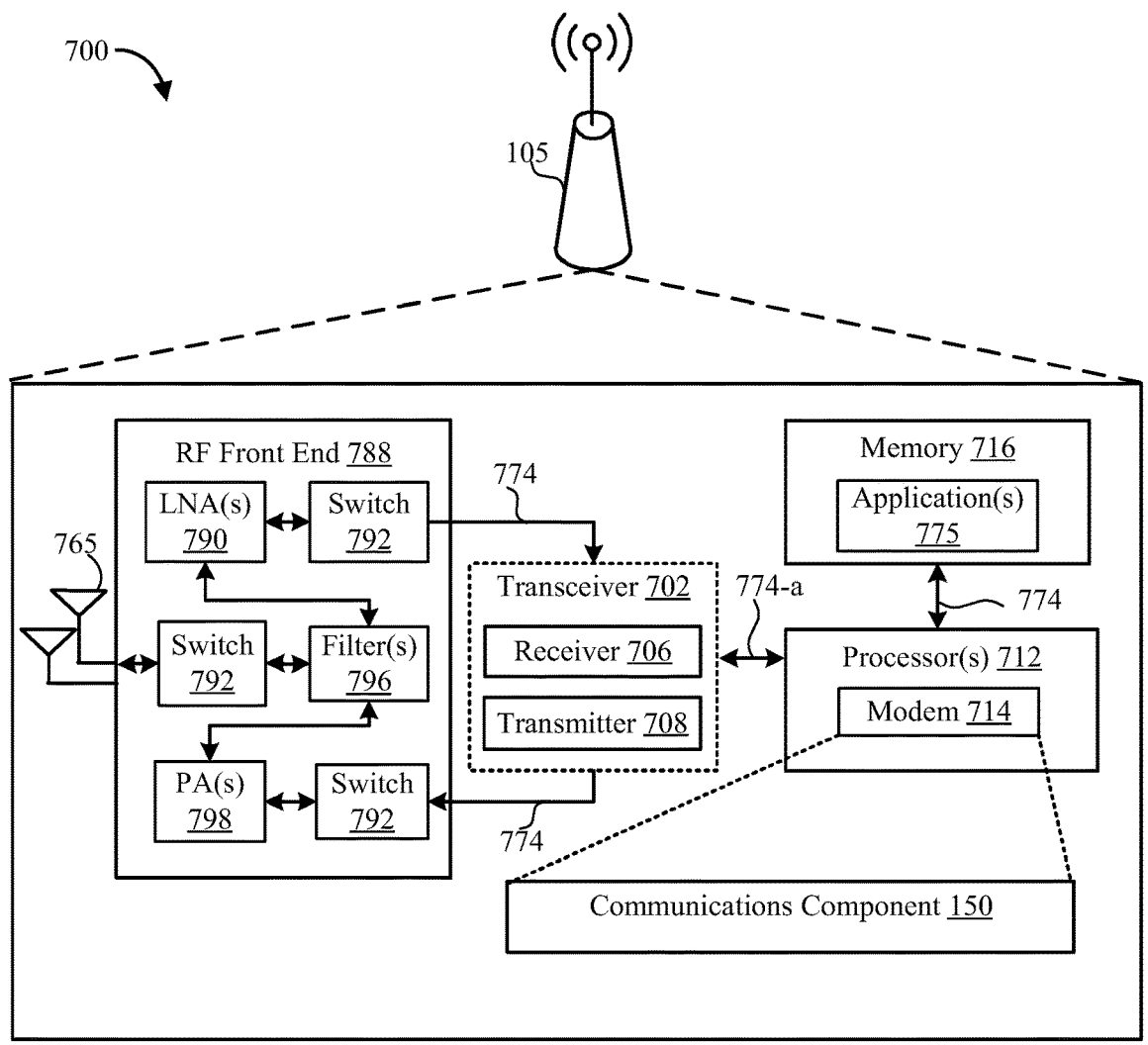
FIG. 7 illustrates an example of hardware implementation of an AP that can be employed within a wireless communication system in accordance with various aspects of present disclosure.

FIG. 7 illustrates an example of hardware implementation of an AP 105 (e.g., AP1 105-*a* or AP2 105-*b* of FIG. 1) that may be employed within a wireless communication system in which an STA is configured to perform the proposed rate adaptation under congestion and latency constraints described in connection with the scenarios or conditions discussed above. The hardware components and subcomponents of the AP 105 can be used to communicate with the STA. An implementation of the AP 105 can include a variety of components, some of which have already been described above. For example, the AP 105 can include one or more processors 712 having a modem 714, a memory 716 having applications 775, a transceiver 702 having a receiver 706 and a transmitter 708, an RF front end 788 having LNAs 790, switches 792, filters 796, and Pas 798. These components can communicate with each other through one or more buses 744. Moreover, these components can generally operate in a similar manner as corresponding components and subcomponents described above with respect to FIG. 6. The communications component 150 can be implemented in the one or more processors 712 and/or as part of the modem Aspects of the present hardware implementations (e.g., FIGS. 6 and 7) and methods (e.g., FIGS. 2-5) are depicted with reference to one or more components or subcomponents, and one or more methods, which can perform the actions or functions described herein. Although the operations or methods described above are presented in a particular order and/or as being performed by an example component, it should be understood that the ordering of the actions and the components performing the actions may be varied, depending on the implementation. In addition, aspects of any one of the methods described above can be combined with aspects of any other of the methods.

Moreover, it should be understood that the actions or functions can be performed by a specially-programmed or specially-configured processor, a processor executing specially-programmed software or computer-readable media, or by any other combination of a hardware component and/or a software component capable of performing the described actions or functions. Moreover, in an aspect, a component may be one of the parts that make up a system, may be hardware or software, and/or may be divided into other components (e.g., subcomponents).

By way of example, an element or component, or any portion of an element or component, or any combination of elements or components can be implemented with a "processing system" that includes one or more processors. A processor can include a general purpose processor, a digital signal processor (DSP), an application specific integrated circuit (ASIC), a field programmable gate array (FPGA) or other programmable logic component, discrete gate or transistor logic, discrete hardware components, or any combination thereof, or any other suitable component designed to perform the functions described herein. A general-purpose processor may be a microprocessor, but in the alternative, the processor may be any conventional processor, controller, microcontroller, or state machine. A processor may also be implemented as a combination of computing components, e.g., a combination of a DSP and a microprocessor, a plurality of microprocessors, one or more microprocessors in conjunction with a DSP, or any other such configuration.

One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on transitory or non-transitory computer-readable medium. A non-transitory computer-readable medium may include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), static RAM (SRAM), dynamic RAM (DRAM), synchronous dynamic RAM (SDRAM); double date rate RAM (DDRAM), read only memory (ROM), programmable ROM (PROM), erasable PROM (EPROM), electrically erasable PROM (EEPROM), a general register, or any other suitable non-transitory medium for storing software.

The various interconnections within a processing system may be shown as buses or as single signal lines. Each of the buses may alternatively be a single signal line, and each of the single signal lines may alternatively be buses, and a single line or bus might represent any one or more of a myriad of physical or logical mechanisms for communication between elements. Any of the signals provided over various buses described herein may be time-multiplexed with other signals and provided over one or more common buses.

The various aspects of this disclosure are provided to enable one of ordinary skill in the art to practice the present disclosure. Various modifications to examples of implementations presented throughout this disclosure will be readily apparent to those skilled in the art, and the concepts disclosed herein may be extended to other devices, systems, or networks. Thus, the claims are not intended to be limited to the various aspects of this disclosure, but are to be accorded the full scope consistent with the language of the claims. All structural and functional equivalents to the various components of the examples of implementations described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112 (f), unless the element is expressly recited using the phrase "means for" or, in the case of a method claim, the element is recited using the phrase "step for."

What is claimed is:

1. A method for rate adaptation using a two-loop operation distinguishing between a retry packet and a new packet, comprising:
   determining whether to transmit the retry packet or the new packet;
   reducing a maximum rate in response to determining to transmit the retry packet;
   transmitting the retry packet based on the reduced maximum rate;
   determining a number of transmitted packets in response to determining to transmit the new packet;
   determining a packet error rate (PER) accumulated over the determined number of transmitted packets in response to determining to transmit the new packet;
   selecting the maximum rate based on the PER; and
   transmitting the new packet based on the selected maximum rate.

2. The method of claim 1, wherein the maximum rate is reduced such that one or more of an amount of time to transmit the retry packet is reduced or reliability in transmitting the retry packet is increased.

3. The method of claim 1, further comprising:
   selecting a modulation/coding scheme (MCS) value, from a plurality of MCS values, to reduce the maximum rate based on the retry packet.

4. The method of claim 1, further comprising:
   selecting a modulation/coding scheme (MCS) value, from a plurality of MCS values, to increase a link-margin reliability or to reduce a congestion level of a medium caused by packet collision.

5. The method of claim 1, wherein the maximum rate is selected further based on a current congestion level of a medium.

6. The method of claim 5, further comprising:
   determining the current congestion level of the medium; and
   comparing the current congestion level against historical congestion levels, wherein the maximum rate is selected based on the comparison.

7. A method for rate adaptation using latency optimizations, comprising:
   determining that a packet to transmit is latency sensitive;
   selecting a number of spatial streams (NSS) in response to the determination that the packet to transmit is latency sensitive;
   determining whether a cause of a packet error rate (PER) was due to congestion and/or a collision in a medium or due to a link margin issue; and
   transmitting the packet based on the selected NSS and based on the cause of the PER.

8. The method of claim 7, further comprising:
   selecting a modulation/coding scheme (MCS) value associated with a high throughput (HT) or a very HT (VHT) data rate for transmitting the packet based on the cause of the PER being the link margin issue, wherein the packet is transmitted further based on the selected MCS value.

9. The method of claim 7, further comprising:
   selecting a data rate associated with a orthogonal frequency-division multiplexing (OFDM) rate for transmitting the packet based on the cause of the PER being the congestion and/or the collision in the medium, wherein the packet is transmitted further based on the selected data rate.

10. The method of claim 9, wherein the data rate is further selected based on a reduced over-the-air (OTA) time for transmitting the packet.

11. The method of claim 7, further comprising:
    selecting a cyclic shift delay (CSD) value for transmitting the packet based on which CSD value of a plurality of CSD values optimizes a link quality while retaining a reduced over-the-air (OTA) time for the packet.

12. The method of claim 7, further comprising:
    selecting a clear channel assessment (CCA) threshold in response to the determination that the packet to transmit is latency sensitive, wherein the packet is transmitted further based on the selected CCA threshold.

13. The method of claim 12, wherein the CCA threshold is increased such that the packet is transmitted at a faster rate.

14. The method of claim 12, wherein the CCA threshold is decreased to minimize a likelihood of collision in a medium.

15. The method of claim 12, wherein the CCA threshold is selected based on a number of previously transmitted retry packets.

16. A method for rate adaptation based on an increase in packet error rate (PER) to improve packet transmission latency and reliability, comprising:
- determining that the PER has increased;
- determining a congestion level of a medium;
- selecting a modulation/coding scheme (MCS) value based on the increased PER;
- increasing the selected MCS value based on the increased PER and the determined congestion level; and
- transmitting a packet based on the increased MCS value.

17. The method of claim 16, further comprising:
- reducing a dynamic spread of MCS values to a subset of the MCS values, wherein the MCS value is selected from the subset of MCS values.

18. The method of claim 16, further comprising:
- determining whether the PER increased due to link margin issues or collision issues, wherein the MCS value is selected further based on whether the PER increased due to link margin issues or collision issues.

19. The method of claim 17, wherein the MCS value is selected to be less than the most significant MCS value of the subset of MCS values in response to the determining that the PER increased due to link margin issues.

20. The method of claim 17, wherein the MCS value is selected to be greater than the least significant MCS value of the subset of MCS values in response to the determining that the PER increased due to collision issues.

21. The method of claim 17, further comprising:
- transmitting an aggregated media access control (MAC) protocol data unit (A-MPDU), wherein the determining whether the PER increased due to link margin issues or collision issues is based on a response to the A-MPDU.

22. A station, comprising:
a processing system configured to:
- determine that a packet to transmit is latency sensitive;
- select a number of spatial streams (NSS) in response to the determination that the packet to transmit is latency sensitive;
- determine whether a cause of a packet error rate (PER) was due to congestion and/or a collision in a medium or due to a link margin issue; and a transceiver configured to transmit the packet based on the selected NSS and based on the cause of the PER.

23. The station of claim 22, wherein the processing system is further configured to:
- select a modulation/coding scheme (MCS) value associated with a high throughput (HT) or a very HT (VHT) data rate for transmitting the packet based on the cause of the PER being the link margin issue, wherein the packet is transmitted further based on the selected MCS value;
- select a data rate associated with a orthogonal frequency-division multiplexing (OFDM) rate for transmitting the packet based on the cause of the PER being the congestion and/or the collision in the medium, wherein the packet is transmitted further based on the selected data rate;
- select a cyclic shift delay (CSD) value for transmitting the packet based on which CSD value of a plurality of CSD values optimizes a link quality while retaining a reduced over-the-air (OTA) time for the packet; or
- select a clear channel assessment (CCA) threshold in response to the determination that the packet to transmit is latency sensitive, wherein the packet is transmitted further based on the selected CCA threshold.

24. The station of claim 23, wherein the data rate is further selected based on a reduced over-the-air (OTA) time for transmitting the packet.

25. The station of claim 23, wherein:
- the CCA threshold is increased such that the packet is transmitted at a faster rate;
- the CCA threshold is decreased to minimize a likelihood of collision in a medium; or
- the CCA threshold is selected based on a number of previously transmitted retry packets.

26. The method of claim 1, wherein the transmitted packets associated with the determined number comprise one or more retry packets and one or more new packets.

* * * * *